US008860363B2

(12) United States Patent
Ang (10) Patent No.: US 8,860,363 B2
(45) Date of Patent: Oct. 14, 2014

(54) POWER SUPPLY SYSTEM FOR ELECTRIC POWERED VEHICLE, CONTROL METHOD THEREOF, AND ELECTRIC POWERED VEHICLE

(75) Inventor: Wanleng Ang, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 13/877,338

(22) PCT Filed: Oct. 21, 2010

(86) PCT No.: PCT/JP2010/068559
§ 371 (c)(1),
(2), (4) Date: Apr. 2, 2013

(87) PCT Pub. No.: WO2012/053084
PCT Pub. Date: Apr. 26, 2012

(65) Prior Publication Data
US 2013/0200846 A1    Aug. 8, 2013

(51) Int. Cl.
| H02J 7/14 | (2006.01) |
| B60L 7/14 | (2006.01) |
| B60L 11/18 | (2006.01) |
| B60L 1/02 | (2006.01) |
| B60L 15/00 | (2006.01) |
| B60L 1/00 | (2006.01) |
| B60L 11/00 | (2006.01) |
| B60L 15/20 | (2006.01) |
| B60L 1/14 | (2006.01) |

(52) U.S. Cl.
CPC ......... *B60L 11/1811* (2013.01); *B60L 2210/40* (2013.01); *Y02T 10/7241* (2013.01);
(Continued)
USPC ............... 320/104; 320/118; 320/132; 320/134; 320/162

(58) Field of Classification Search
USPC ........................................... 320/104
See application file for complete search history.

(56) References Cited

U.S. PATENT DOCUMENTS 7,796,410 B2 * 9/2010 Takayanagi et al. ............ 363/37
2003/0146726 A1 8/2003 Ishikawa et al.
(Continued)

FOREIGN PATENT DOCUMENTS

| JP | A-2003-235105 | 8/2003 |
| JP | A-2009-27774 | 2/2009 |

(Continued)

*Primary Examiner* — Edward Tso
*Assistant Examiner* — Johali Torres Ruiz
(74) *Attorney, Agent, or Firm* — Oliff PLC (57) ABSTRACT

A charge device converting electric power from an external power supply into a charging electric power for a power storage device is configured to allow power conversion bidirectionally. An AC/DC converter of an external charging system converts AC power of a power line into a charging electric power for an auxiliary battery. A DC/DC converter of the vehicle running system converts the electric power from the power storage device into the charging power for the auxiliary battery. When charging of the auxiliary battery is requested, a control device selectively executes a first charge of converting the electric power of the power storage device by the DC/DC converter to charge the auxiliary battery, and a second charge of converting the electric power of the power storage device by a charge device and the AC/DC converter to charge the auxiliary battery, according to an output state of the auxiliary battery.

14 Claims, 5 Drawing Sheets

(52) U.S. Cl.
CPC ............... *B60L 7/14* (2013.01); *Y02T 10/7005* (2013.01); *Y02T 90/127* (2013.01); *B60L 11/1816* (2013.01); *Y02T 90/121* (2013.01); *B60L 2240/549* (2013.01); *Y02T 10/642* (2013.01); *Y02T 10/7066* (2013.01); *B60L 2240/547* (2013.01); *B60L 11/1803* (2013.01); *B60L 2210/10* (2013.01); *Y02T 90/14* (2013.01); *Y02T 10/7022* (2013.01); *B60L 1/02* (2013.01); *Y02T 10/7216* (2013.01); *B60L 15/007* (2013.01); *B60L 1/003* (2013.01); *B60L 2240/545* (2013.01); *B60L 11/005* (2013.01); *B60L 2210/30* (2013.01); *B60L 11/1868* (2013.01); *Y02T 10/7088* (2013.01); *B60L 15/2009* (2013.01); *B60L 2240/423* (2013.01); *B60L 1/14* (2013.01)

(56) References Cited

U.S. PATENT DOCUMENTS

| | | | |
|---|---|---|---|
| 2009/0039831 A1* | 2/2009 | Ichikawa | 320/118 |
| 2009/0179616 A1* | 7/2009 | Ichikawa et al. | 320/134 |
| 2010/0228413 A1 | 9/2010 | Fujitake | |
| 2011/0187184 A1 | 8/2011 | Ichikawa | |
| 2013/0020863 A1 | 1/2013 | Sugiyama et al. | |

FOREIGN PATENT DOCUMENTS

| | | |
|---|---|---|
| JP | A-2009-077535 | 4/2009 |
| JP | A-2009-225587 | 10/2009 |
| JP | A-2010-068623 | 3/2010 |
| JP | A-2011-223833 | 11/2011 |

* cited by examiner

POWER SUPPLY SYSTEM FOR ELECTRIC POWERED VEHICLE, CONTROL METHOD THEREOF, AND ELECTRIC POWERED VEHICLE

TECHNICAL FIELD

The present invention relates to a power supply system for an electric powered vehicle, a method of controlling a power supply system, and an electric powered vehicle. More particularly, the present invention relates to the charging control of an auxiliary battery for an electric powered vehicle incorporating a main power storage device (high voltage) for feeding power to a traction motor, and a sub power storage device (low voltage) for feeding power to an auxiliary machine including a control device, capable of charging by an external power supply.

BACKGROUND ART

As an electric powered vehicle configured to allow running by an electric motor using electric power from a vehicle-mounted power storage device typically represented by a secondary battery, there is known an electric car, a hybrid vehicle, a fuel cell vehicle or the like. An electric powered vehicle is generally configured having two types of power storage devices mounted, i.e. a power storage device of high voltage (for example, main battery) used to feed power to a traction motor, and a power storage device of low voltage (for example, auxiliary battery) used to feed power to an auxiliary machine including a control device.

In recent years, there has been developed an electric powered vehicle allowing a vehicle-mounted power storage device to be charged by a power supply external to the vehicle (hereinafter, also referred to as "external power supply"). For example, Japanese Patent Laying-Open No. 2009-27774 (PTL 1) discloses a configuration of an electric powered vehicle having the charging efficiency improved during an external charging mode.

Specifically, the electric powered vehicle of PTL 1 includes a main battery capable of being charged by an external power supply, a DC/DC converter down-converting the voltage of the main battery for output, and an auxiliary battery charged by the output voltage from the DC/DC converter. The DC/DC converter is operated continuously in a driving mode of the vehicle, and operated intermittently in an external charging mode. Accordingly, the power consumption by the DC/DC converter can be suppressed to improve the charging efficiency of external charging.

CITATION LIST

Patent Literature

PTL: Japanese Patent Laying-Open No. 2009-27774

SUMMARY OF INVENTION

Technical Problem

When the remaining amount in the main power storage device (main battery) becomes low in an electric powered vehicle, the vehicle cannot run. When the voltage of the sub power storage device (auxiliary battery) is reduced, the control device may not be able to operate properly, leading to the possibility that the vehicle cannot run even if the remaining amount in the main power storage device is ensured. Particularly at the time of activating the system at the start of vehicle running, it is necessary to avoid reduction in the output of the sub power storage device (auxiliary battery).

An electric powered vehicle generally has the auxiliary battery charged by the electric power from an external power supply concurrently with the main battery in an external charging mode. In a mode other than the external charging mode, the auxiliary battery is charged by the DC/DC converter down-converting the output power from the main battery, as taught in PTL 1. The DC/DC converter is connected in an energizing path from the main power storage device up to the traction motor. Generally, the electric power transferred between the main power storage device and the traction motor during the running mode of the vehicle is greater than the electric power supplied from an external power supply during the external charging mode. Therefore, the DC/DC converter has a relatively large power capacity, which means that the power consumption thereby is greater than that of the power converter used in an external charging mode.

In the energizing path between the main power storage device and the traction motor, a main relay of a relatively large capacity, switching on at the time of system activation, is generally arranged. The excitation current for switching on the main relay is generally supplied by the electric power from the auxiliary battery. Therefore, in order to initiate charging of the auxiliary battery under the state where an external power supply is not connected, the power consumption of the auxiliary battery to operate the DC/DC converter and/or main relay will be increased.

Under the state of difficulty in ensuring the output from the auxiliary battery, it will be difficult to initiate control to form a charge system path of the auxiliary battery. As a result, there is a possibility that the electrical system for vehicle running may not be actuated when the output from the auxiliary battery is significantly reduced.

The present invention is directed to solving such a problem. An object of the present invention is to provide a configuration of a power supply system that can reliably form a charging path for a sub power storage device that is the power supply for a control system by the electric power from a main power storage device, in an electric powered vehicle capable of external charging, even when the output from the sub power storage device is reduced.

Solution to Problem

According to an aspect of the present invention, a power supply system for an electric powered vehicle includes a main power storage device, a charge device, a sub power storage device, a first power converter, a second power converter, and a control device. The main power storage device is configured to store electric power input/output with respect to an electric motor that generates vehicle driving power. The charge device is configured to selectively allow execution of a first power conversion of converting electric power from an external power supply into charging electric power for the main power storage device, and a second power conversion that is at least a portion of power conversion in a direction opposite to the direction of the first power conversion. The output voltage of the sub power storage device is lower than the output voltage of the main power storage device. The first power converter is connected to a path between the main power storage device and the electric motor, and configured to convert the electric power from the main power storage device into the charging electric power for the sub power storage device. The second power converter is connected to a path between a connection unit for connection with the external power supply and the main power storage device, and configured to convert the electric power obtained by the second power conversion through the charge device into the charging electric power for the sub power storage device. A rated output of the second power converter is smaller than the rated output of the first power converter. The control device is configured to selectively execute, when the sub power storage device is to be charged, a first charge of charging the sub power storage device by the first power converter while the charge device and the second power converter are stopped, and a second charge of charging the sub power storage device by the charge device and the second power converter while the first power converter is stopped, according to an output state of the sub power storage device.

Preferably, the control device selects the second charge to charge the sub power storage device when a state value indicating the output state of the sub power storage device is lower than a predetermined decision value.

More preferably, the state value is an allowable electric power output upper limit, output voltage, or temperature of the sub power storage device.

Preferably, the external power supply supplies AC power. The charge device includes a third power converter and a fourth power converter. The third power converter is configured to carry out AC/DC power conversion bidirectionally between a first power line connected to the external power supply in an external charging mode and a second power line for transmitting DC voltage. The fourth power converter is configured to carry out DC/DC power conversion bidirectionally between the second power line and the main power storage device. In the second power conversion, the third power converter and the fourth power converter convert the electric power from the main power storage device into AC power for output onto the first power line. The second power converter converts the AC power of the first power line obtained by the second power conversion into DC power for charging the sub power storage device.

Alternatively, the external power supply supplies AC power, and the charge device includes a third power converter and a fourth power converter. The third power converter is configured to convert AC power of the first power line connected with the external power supply in an external charging mode into DC power for output onto a second power line for transmitting DC voltage. The fourth power converter is configured to carry out DC/DC power conversion bidirectionally between the second power line and the main power storage device. In the second power conversion, the fourth power converter converts the electric power from the main power storage device into DC voltage for output onto the second power line. The second power converter converts the DC power of the second power line obtained by the second power conversion into DC power for charging the sub power storage device.

Preferably, the power consumption by the first power converter is greater than the sum of the power consumption by the second power converter and the power consumption by the charge device through the second power conversion.

Preferably, the second power converter is configured to generate the charging electric power for the sub power storage device with the electric power from the external power supply as the source in an external charging mode. The control device executes a third charge of charging the sub power storage device by the second power converter while the first power converter is stopped in an external charging mode.

According to another aspect of the present invention, an electric powered vehicle allowing charging by an external power supply includes an electric motor generating vehicle driving power, a main power storage device, a charge device, a sub power storage device, a first power converter, a second power converter, and a control device. The main power storage device is configured to store electric power input/output with respect to the electric motor. The output voltage of the sub power storage device is lower than the output voltage of the main power storage device. The charge device is configured to selectively allow execution of a first power conversion of converting the electric power from the external power supply into the charging electric power for the main power storage device, and a second power conversion that is at least a portion of power conversion in a direction opposite to the direction of the first power conversion. The first power converter is connected to a path between the main power storage device and the electric motor, and is configured to convert the electric power from the main power storage device into the charging electric power for the sub power storage device. The second power converter is connected to a path between a connection unit for connection with the external power supply and the main power storage device, and configured to convert the electric power obtained by the second power conversion through the charge device into the charging electric power for the sub power storage device. The rated output of the second power converter is smaller than the rated output of the first power converter. The control device is configured to selectively execute, when the sub power storage device is to be charged, a first charge of charging the sub power storage device by the first power converter while the charge device and the second power converter are stopped, and a second charge of charging the sub power storage device by the charge device and the second power converter while the first power converter is stopped, according to an output state of the sub power storage device.

Preferably, the control device selects the second charge to charge the sub power storage device when a state value indicating an output state of the sub power storage device is lower than a predetermined decision value.

Preferably, the power consumption by the first power converter is greater than the sum of the power consumption by the second power converter and the power consumption by the charge device through the second power conversion.

Alternatively, the second power converter is preferably configured to generate the charging electric power for the sub power storage device with the electric power from the external power supply as a source in an external charging mode. The control device executes a third charge of charging the sub power storage device by the second power converter while the first power converter is stopped in an external charging mode.

A further aspect of the present invention is directed to a method of controlling a power supply system for an electric powered vehicle incorporating an electric motor that generates vehicle driving power. The power supply system includes a main power storage device, a charge device, a sub power storage device, a first power converter, and a second power converter. The main power storage device is configured to store electric power input/output with respect to the electric motor. The output voltage of the sub power storage device is lower than the output voltage of the main power storage device. The charge device is configured to selectively allow execution of a first power conversion converting the electric power from the external power supply into the charging electric power for the main power storage device, and a second power conversion that is at least a portion of the power conversion in a direction opposite to the direction of the first power conversion. The first power converter is connected to a path between the main power storage device and the electric motor, and is configured to convert the electric power from the main power storage device into the charging power for the sub power storage device. The second power converter is connected to a path between a connection unit for connection with the external power supply and the main power storage device, and configured to convert the electric power obtained by the second power conversion through the charge device into the charging electric power for the sub power storage device. The rated output of the second power converter is smaller than the rated output of the first power converter. The control method includes the steps of sensing a charge request of the sub power storage device, detecting an output state of the sub power storage device when charging is started in response to the charge request, and selecting the first charge and the second charge according to the detected output state. In the first charge, the sub power storage device is charged by the first power converter while the charge device and the second power converter are stopped. In the second charge, the sub power storage device is charged by the charge device and the second power converter while the first power converter is stopped.

Preferably, in the step of selecting, the second charge is selected to charge the sub power storage device when a state value indicating an output state of the sub power storage device is lower than a predetermined decision value. Preferably, the state value is an allowable electric power output upper limit, an output voltage, or temperature of the sub power storage device.

Advantageous Effect of Invention

In an electric powered vehicle allowing external charging and a power supply system of the electric powered vehicle of the present invention, a charging path for a sub power storage device that is the power supply of the control system, by the electric power from the main power storage device, can be formed reliably even when the output of the sub power storage device is reduced.

DESCRIPTION OF EMBODIMENTS

Figure 1:
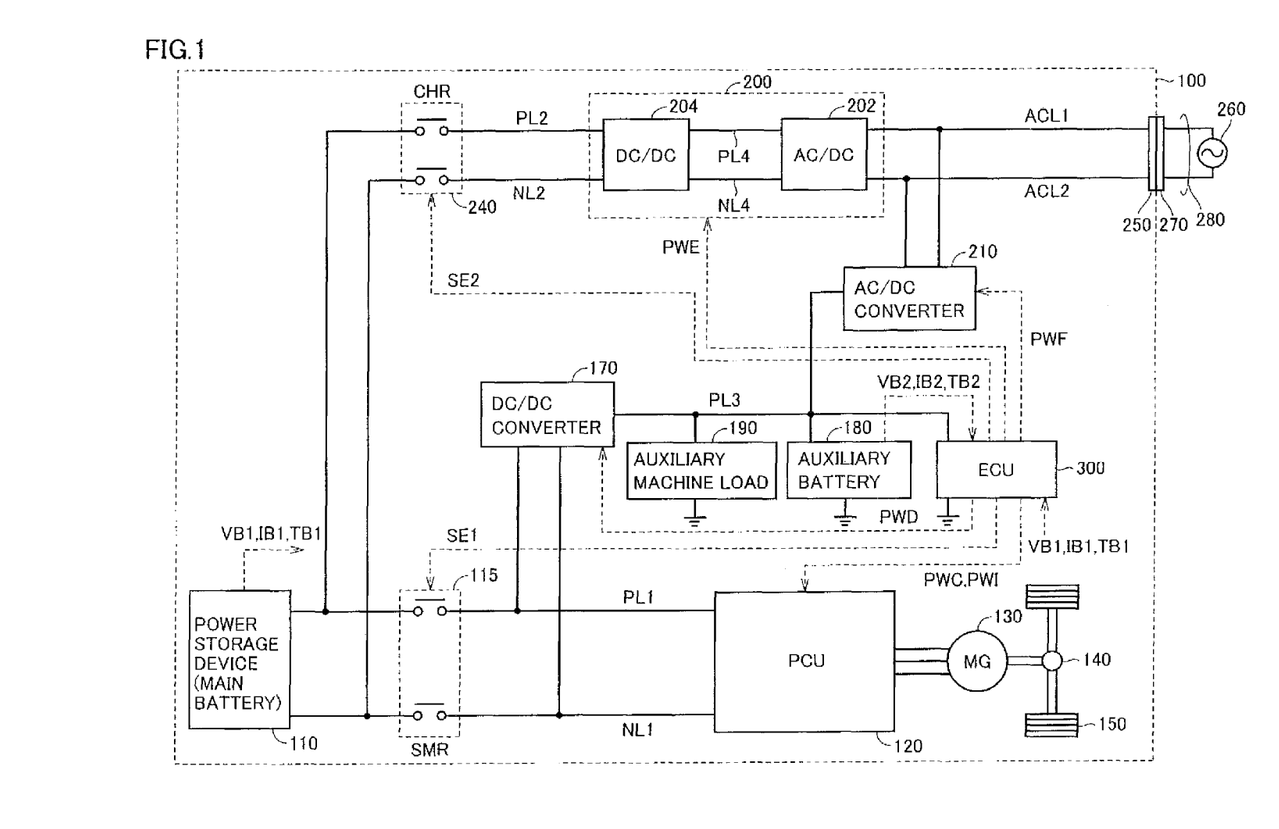
FIG. 1 is a block diagram representing a configuration of an electric powered vehicle including a power supply system according to an embodiment of the present invention.

FIG. 1 is a block diagram representing a configuration of an electric powered vehicle including a power supply system according to an embodiment of the present invention. Referring to FIG. 1, an electric powered vehicle 100 includes a power storage device 110 corresponding to a "main power storage device", a system main relay (hereinafter, also referred to as SMR) 115, a PCU (Power Control Unit) 120, a motor generator 130 that is a traction motor, a power transmission gear 140, a driving wheel 150, and a control device 300.

Power storage device 110 is an electric power storage element configured to enable charging/discharging, and is formed of a secondary battery typically represented by a lithium ion battery or nickel-metal hydride battery. The output voltage of power storage device 110 is approximately 200V, for example. Alternatively, power storage device 110 may be constituted of a storage element such as an electric double layer capacitor, or a combination of a storage element and a secondary battery.

Control device 300 is constituted of an electronic control unit including a CPU (Central Processing Unit), a memory device, and an input/output buffer, not shown. Control device 300 (hereinafter, also referred to as ECU 300) controls various apparatuses incorporated in electric powered vehicle 100. The control is not restricted to processing by software, and processing is also allowed through dedicated hardware (electronic circuit).

Power storage device 110 is connected to a power line PL1 and a ground line NL1 via SMR 115. Power line PL1 and ground line NL1 are connected to PCU 120 for driving motor generator 130. Power storage device 110 supplies to PCU 120 the electric power for generating the driving force of electric powered vehicle 100. Power storage device 110 also stores the electric power generated at motor generator 130.

The relay included in SMR 115 has one end connected to the positive terminal and negative terminal of power storage device 110. The relay in SMR 115 has the other end connected to power line PL1 and ground line NL1 connected to PCU 120. SMR 115 switches between the supply and cut off of the electric power between power storage device 110 and PCU 120 based on a control signal SE1 from ECU 300.

Figure 2:
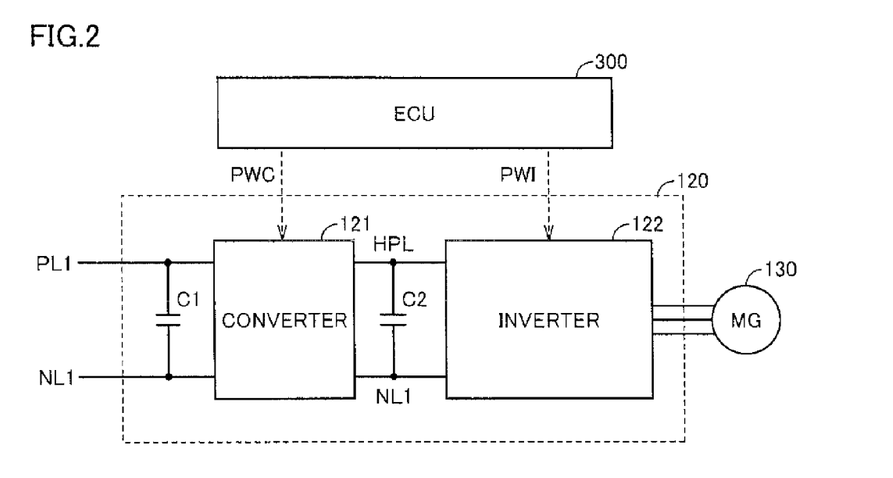
FIG. 2 is a block diagram representing an example of a configuration of the PCU shown in FIG. 1.

FIG. 2 represents an example of an internal configuration of PCU 120.

Referring to FIG. 2, PCU 120 includes a converter 121, an inverter 122, and smoothing capacitors C1 and C2.

Converter 121 carries out bidirectional power conversion from power line PL1 and ground line NL1 to power line HPL and ground line NL1 or from power line HPL and ground line NL1 to power line PL1 and ground line NL1 based on control signal PWC from ECU 300. For converter 121, the circuit configuration of a power conversion circuit capable of DC voltage conversion (for example, bidirectional chopper circuit) can be applied arbitrarily.

Inverter 122 is connected to power line HPL and ground line NL1. Based on a control signal PWI from ECU 300, inverter 122 converts the DC power supplied from converter 121 into AC power to drive motor generator 130. For inverter 122, the circuit configuration of a general 3-phase inverter may be applied.

Although a configuration having one pair of a motor generator and inverter is shown in the present embodiment, a configuration in which there are a plurality of pairs of the motor generator and inverter may be employed.

Smoothing capacitor C1 is provided between power line PL1 and ground line NL1 to reduce the voltage variation therebetween. Capacitor C2 is provided between power line HPL and ground line NL1 to reduce the voltage variation therebetween.

Referring to FIG. 1 again, motor generator 130 is an AC rotating electric machine such as a permanent magnet type synchronous electric motor including a rotor with a permanent magnet embedded.

The output torque from motor generator 130 is transmitted to driving wheel 150 via power transmission gear 140 constituted of a decelerator and/or power split mechanism not shown. Electric powered vehicle 100 runs by the torque transmitted to driving wheel 150. In a regenerative braking mode of electric powered vehicle 100, motor generator 130 can generate power by the rotation force of driving wheel 150. The generated electric power is converted into the charging power for power storage device 110 by PCU 120.

In a hybrid vehicle having an engine (not shown) incorporated in addition to motor generator 130, the required driving force for the vehicle is generated by the cooperative operation of the engine and motor generator 130. In this case, power storage device 110 can be charged using the electric power generated by the rotation of the engine.

Electric powered vehicle 100 of the present embodiment represents a vehicle incorporating an electric motor for generating the vehicle driving force. The electric powered vehicle of the present invention is intended to include a hybrid vehicle generating a vehicle driving force by an engine and electric motor, as well as an electric car and fuel cell vehicle not incorporating an engine, or the like.

In the context of the configuration of electric powered vehicle 100 shown in FIG. 1, the portion other than motor generator 130, power transmission gear 140 and driving wheel 150 constitute the power supply system for the electric powered vehicle.

The power supply system further includes, as a configuration for power storage device 110 to be externally charged by the electric power from an external power supply 260 (external charge system), a charge device 200, an AC/DC converter 210, a charge relay 240, and a connection unit 250. External power supply 260 is generally constituted of a commercial AC power supply.

To connection unit 250 is connected a charge connector 270 of a charge cable 280 for electrically connecting external power supply 260 with electric powered vehicle 100. The electric power from external power supply 260 is transmitted to electric powered vehicle 100 via charge cable 280.

Charge device 200 is connected to connection unit 250 via power lines ACL1 and ACL2. Charge device 200 is electrically connected with power storage device 110 via power line PL2 and ground line NL2, and a charge relay 240 (hereinafter, also referred to as CHR 240) switching on in an external charging mode.

CHR 240 is connected between the positive terminal of power storage device 110 and power line PL2, and between the negative terminal of power storage device 110 and ground line NL2. CHR 240 establishes or cuts the energizing path between power storage device 110 and charge device 200 based on a control signal SE2 from ECU 300.

In an external charging mode, an energizing path to charge main power storage device 110 and auxiliary battery 180 through the electric power from external power supply 260 is established in response to CHR 240 being switched on. In a mode other than the external charging mode (non external charging mode), the apply of the output voltage from power storage device 110 to the group of devices in the external charging system can be avoided by switching CHR 240 off. Accordingly, the lifetime of the group of devices in the external charging system can be increased. Similarly, by switching SMR 115 off in an external charging mode, the electric power for external charging can be prevented from being applied to the group of devices in the vehicle running system downstream of SMR 115. Accordingly, the lifetime of the group of devices in the vehicle running system can be prevented from being reduced by the effect of external charging.

Charge device 200 converts the AC power supplied from external power supply 260 into DC power for charging power storage device 110, based on a control signal PWE from ECU 300. Charge device 200 includes an AC/DC converter 202 and a DC/DC converter 204.

AC/DC converter 202 converts the AC power between power lines ACL1 and ACL2 into DC power for output to power line PL4 and ground line NL4. In other words, AC/DC converter 202 corresponds to "third power converter" and power lines ACL1 and ACL2 correspond to "first power line".

DC/DC converter 204 converts the DC power on power line PL4 into the charging electric power for power storage device 110 by the DC voltage conversion operation for output to power line PL2 and ground line NL2. DC/DC converter 204 corresponds to "fourth power converter", and power line PL4 corresponds to "second power line".

Figure 3:
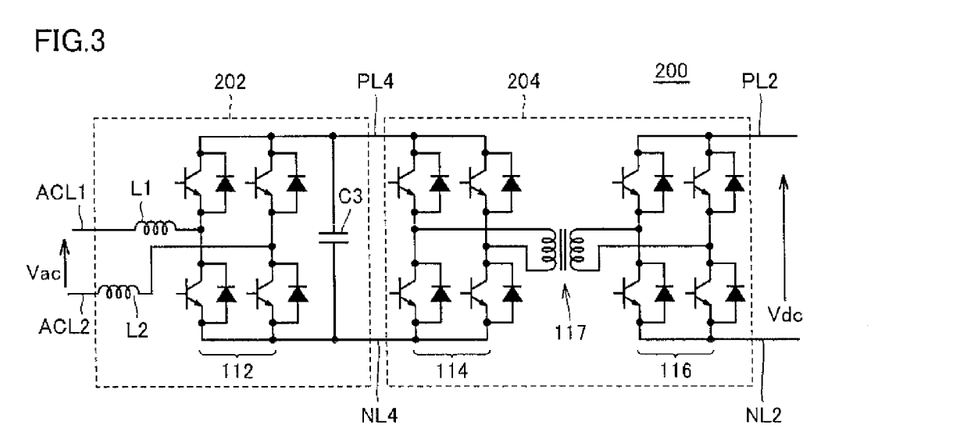
FIG. 3 is a circuit diagram representing an example of a configuration of the charge device for external charging shown in FIG. 1.

FIG. 3 represents an example of a configuration of charge device 200.

Referring to FIG. 3, AC/DC converter 202 includes reactors L1 and L2, a smoothing capacitor C3, and a bridge circuit 112.

Reactor L1 is connected in series with power line ACL1. Reactor L2 is connected in series with power line ACL2. Bridge circuit 112 converts AC voltage Vac between power lines ACL1 and ACL2 into DC voltage for output to power line PL4 and ground line NL4 by the on/off control of the power semiconductor switching element. Smoothing capacitor C1 is connected between power line PL4 and ground line NL4.

DC/DC converter 204 includes bridge circuits 114 and 116, and a transformer 117.

Bridge circuit 114 converts the DC voltage of power line PL4 and ground line NL4 into AC power for output to the primary side of transformer 117 by the on/off control of the power semiconductor switching element. Transformer 117 converts the AC voltage of the primary side according to a predetermined primary/secondary side winding ratio for output to the secondary side.

Bridge circuit 116 converts the AC voltage of the secondary side of transformer 117 into DC voltage, and outputs the converted DC voltage Vdc to power line PL2 and ground line NL2 by the on/off control of the power semiconductor switching element.

Accordingly, AC voltage Vac from external power supply 260 (for example 100 VAC) can be converted into DC voltage Vdc for charging power storage device 110 while ensuring insulation between external power supply 260 and power storage device 110.

Charge device 200 is configured to execute at least a portion of the power conversion in a direction opposite to the direction of the above-described power conversion for external charging. In the examples of FIGS. 1 and 3, each of AC/DC converter 202 and DC/DC converter 204 is formed capable of power conversion bidirectionally.

Specifically, DC/DC converter 204 is further capable of converting DC voltage Vdc transmitted from power storage device 110 to power line PL2 and ground line NL2 into DC voltage for output to power line PL4 and ground line NL4. This function can be realized by the on/off control of the power-directed semiconductor switching element constituting bridge circuits 114 and 116.

Similarly, AC/DC converter 202 is capable of converting the DC voltage between power line PL4 and ground line NL4 into AC power substantially equal to the electric power from external power supply 260 for output onto power lines ACL1 and ACL2. This function can be realized by the on/off control of the power semiconductor switching element constituting bridge circuit 112.

For the on/off control of the power semiconductor switching element for AC/DC conversion or DC/AC conversion at bridge circuits 112, 114 and 116, the well-known control is applicable. Therefore, detailed description will not be provided.

Referring to FIG. 1 again, the power supply system further includes, as the configuration of the low voltage system (auxiliary machine system), DC/DC converter 170, an auxiliary battery 180 corresponding to "sub power storage device", and auxiliary machine load 190.

DC/DC converter 170 is connected to power line PL1 and ground line NL1 for down-converting the DC voltage supplied from power storage device 110 based on control signal PWD from ECU 300. DC/DC converter 170 supplies electric power to the entire low voltage system of the vehicle such as auxiliary battery 180, auxiliary machine load 190 and ECU 300 via power line PL3. The operating power of DC/DC converter 170 (for example, the power consumption by the power supply for control) is supplied from power line PL3 by the electric power of auxiliary battery 180.

Thus, DC/DC converter 170 is connected to the path between power storage device 110 and motor generator 130, and is configured to convert the electric power from power storage device 110 into the charging electric power for auxiliary battery 180. DC/DC converter 170 is typically a switching regulator including a power semiconductor switching element (not shown), and the well-known arbitrary circuit configuration can be applied.

Auxiliary battery 180 is typically formed of a lead battery. The output voltage from auxiliary battery 180 is approximately 12V, for example, lower than the output voltage of power storage device 110.

Auxiliary machine load 190 includes, for example, the lamp group, windshield wiper, heater, audio, navigation system, and the like. The excitation current of SMR 115 and CHR 240, responding to control signals SE1 and SE2 from ECU 300, is supplied from power line PL3 by the electric power of auxiliary battery 180.

AC/DC converter 210 is connected between power lines ACL1, ACL2 and power line PL3. For AC/DC converter 210, preferably a device provided for the purpose of charging auxiliary battery 180 in an external charging mode is employed.

AC/DC converter 210 is under control of a control signal PWF from ECU 300 to convert the AC voltage supplied from external power supply 260 into DC voltage. Accordingly, the charging of auxiliary battery 180 and the driving of auxiliary machine load 190 can be carried out using the electric power from AC/DC converter 210 in an external charging mode without having to activate DC/DC converter 170 while SMR 115 is off.

In electric powered vehicle 100, the electric power transferred between power storage device 110 and motor generator 130 during the drive of the vehicle is larger than the electric power supplied to power storage device 110 from external power supply 260 during an external charging mode. Therefore, the current capacity of SMR 115 operated during the drive of the vehicle is greater than the current capacity of CHR 240 that is operated during an external charging mode. Therefore, the power consumed for switching SMR 115 on (mainly, the excitation current of the relay) is greater than the power consumed to switch CHR 240 on.

Similarly, an element of a relatively large capacity is generally employed, as described above, for DC/DC converter 170 to supply electric power to the auxiliary machine system during the drive of the vehicle. AC/DC converter 210 is provided for the purpose of supplying electric power to the low voltage system in an external charging mode. Although auxiliary machine load 190 may be operated by the driver during an external charging mode, the power consumption by auxiliary machine load 190 is relatively lower than the power consumption during the drive of the vehicle. Therefore, for AC/DC converter 210, an element having a rating output smaller than that of DC/DC converter 170 set forth above can be employed. As a result, the power consumption during the operation of AC/DC converter 210 is lower than the power consumption during the operation of DC/DC converter 170. Since charge device 200 is directed to power conversion in an external charging mode, the rated power and power consumption during operation are relatively low.

ECU 300 outputs a control signal for the control of SMR 115, PCU 120, DC/DC converter 170, charge device 200, AC/DC converter 210, CHR 240, and the like.

ECU 300 receives a detection value of voltage VB1, temperature TB1 and current IB1 from a sensor (not shown) in power storage device 110. ECU 300 calculates the state of charge (SOC) of power storage device 110 based on at least one of these detection values. ECU 300 receives the detection value of at least one of voltage VB2, temperature TB2 and current IB2 from a sensor (not shown) included in auxiliary battery 180. ECU 300 can sense the output state of auxiliary battery 180 based on the detection value of auxiliary battery 180.

Although a configuration in which the control function of respective devices in electric powered vehicle 100 is generically embodied in ECU 300 in FIG. 1, the function of ECU 300 may partially be arranged in a divided manner. For example, the control function of the devices of the external charge system (for example, charge device 200 and CHR 240) may be provided in another ECU differing from ECU 300.

When charging of auxiliary battery 180 is requested under the state where external power supply 260 is not connected, the charging power for auxiliary battery 180 is generated by the conversion of the electric power from power storage device 110 by DC/DC converter 170. However, when auxiliary battery 180 is to be charged, the operating power for the ON switching of SMR 115 and for DC/DC converter 170 must be supplied from auxiliary battery 180. Therefore, in the case where the output from auxiliary battery 180 is low, there is a possibility of excessive load being exerted on auxiliary battery 180. Particularly in the case where the output from auxiliary battery 180 is extremely low, the electric power for activating SMR 115 and DC/DC converter 170 may not be ensured, leading to the possibility that charging of auxiliary battery 180 cannot be initiated.

At electric powered vehicle 100 of the present embodiment, the output from power storage device 110 can be converted into AC power for output onto power lines ACL1 and ACL2 by power conversion in a direction opposite to that of external charging by charge device 200, even under the state where external power supply 260 is not connected to electric powered vehicle 100 (non external charging mode). Therefore, using the device of the external charging system having a relatively low power consumption can be used to convert the electric power from power storage device 110 into the electric power for the low voltage system, i.e. conversion into the charging power for auxiliary battery 180, even in a non external charging mode. In other words, by operating CHR 240, charge device 200 and AC/DC converter 210, auxiliary battery 180 can be charged while SMR 115 and DC/DC converter 170 having relatively large power consumption are still stopped.

Therefore, the power supply system for the electric powered vehicle according to the present embodiment reflects the output state of auxiliary battery 180 in the charge control.

Figure 4:
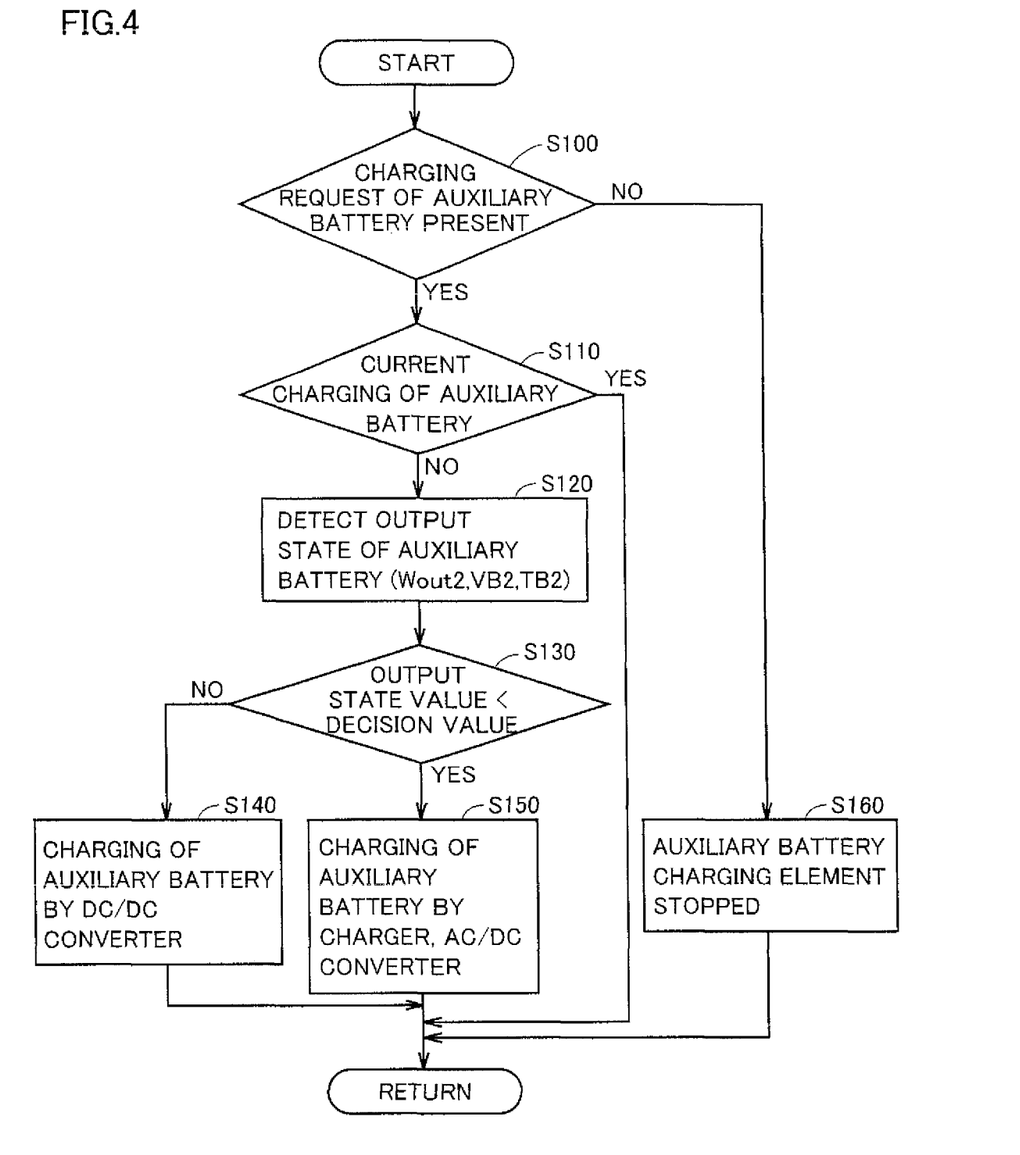
FIG. 4 is a flowchart for describing an auxiliary battery charge control at the power supply system according to an embodiment of the present invention.

FIG. 4 is a flowchart for describing the auxiliary battery charge control at the power supply system for the electric powered vehicle according to the present embodiment.

The flowchart of FIG. 4 is executed at every predetermined cycle including an operation stop mode by ECU 300 under the state where external power supply 260 is not connected to electric powered vehicle 100 (non external charging mode). In other words, when charging of the auxiliary battery is requested under the state where auxiliary battery 180 can be charged by external power supply 260, the charging of auxiliary battery 180 by AC/DC converter 210 using the electric power from external power supply 260 is given higher priority.

Referring to FIG. 4, ECU 300 determines whether there is a charging request of auxiliary battery 180 at step S100. The determination at S100 is executed based on the SOC or voltage VB2 of auxiliary battery 180, for example. Once the charging of auxiliary battery 180 is initiated, the YES determination of S100 is maintained until the relevant charging is completed.

When there is a charging request of auxiliary battery 180 (YES determination at S100), ECU 300 proceeds to the process of step S110. At step S110, a determination is made whether auxiliary battery 180 is currently being charged. At the time of initiating charging, ECU 300 proceeds to the process of step S120 by a NO determination at S110.

At step S120, ECU 300 detects an output state value indicating the output state of the auxiliary battery. By way of example, this state value is an upper limit Wout2 of the output power of auxiliary battery 180. For example, output power upper limit Wout2 can be calculated based on current IB2, the state of charge (SOC), temperature TB2, voltage VB2, and the like of auxiliary battery 180.

In order to readily obtain the state value, the direct value of voltage VB2 or temperature TB2 of auxiliary battery 180, or a parameter value calculated based on a combination thereof may be detected as the output state value of auxiliary battery 180.

At step S130, ECU 300 determines the output state value of auxiliary battery 180 detected at state S120 with a predetermined decision value at step S130. When the output state value is lower than the decision value (YES determination at step S130), a determination is made that the output of auxiliary battery 180 is reduced. Therefore, ECU 300 proceeds to the process of step S150 to select the charging of the auxiliary battery by charge device 200 and AC/DC converter 210. Namely, ECU 300 designates the ON of CHR 240, as well as the activation of charge device 200 and AC/DC converter 210 while the OFF of SMR 115 and stop of DC/DC converter 170 are maintained. When the output state value is not lower than the decision value (NO determination at S130), ECU 300 determines that the output of auxiliary battery 180 is not reduced. Therefore, ECU 300 proceeds to the process of step S140 to select charging of the auxiliary battery by DC/DC converter 170. Namely, ECU 300 designates the ON of SMR 115 and activation of DC/DC converter 170 while the devices of the external charge system (CHR 240, charge device 200, and AC/DC converter 210) are stopped.

Once the charging of the auxiliary battery is initiated, S100 provides a YES determination and S110 provides a YES determination until the charging ends. Therefore, charging of the auxiliary battery selected by steps S120 to S150 at the start of charging is continued.

When charging of auxiliary battery 180 is completed, a NO determination is output at step S100. As a result, at step S160, ECU 300 stops each of DC/DC converter 170, charge device 200 and AC/DC converter 210 that are the charging elements for the auxiliary battery. When CHR 240 is switched ON for charging the auxiliary battery, CHR 240 is switched OFF at this stage.

Thus, when output of auxiliary battery 180 is reduced according to the electric powered vehicle and power supply system of the present embodiment, auxiliary battery 180 can be charged by means of CHR 240, charge device 200, and AC/DC converter 210, having a relatively low power consumption, without using SMR 115 and DC/DC converter 170 that have a large power consumption. Therefore, the charging path of auxiliary battery 180 by the electric power from power storage device 110 can be formed reliably even in the case where the output of auxiliary battery 180 is reduced and sufficient output voltage of auxiliary battery 180 cannot be ensured.

According to the configuration of FIG. 1, in the case where SMR 115 and CHR 240 are not arranged, or in the case where DC/DC converter 170 is connected to an upstream side of SMR 115 (power storage device 110 side), the auxiliary battery charge control shown in FIG. 4 can be applied when the power consumption by DC/DC converter 170 is greater than the sum of the power consumed in charging auxiliary battery 180 through the external charging system.

Modification

Figure 5:
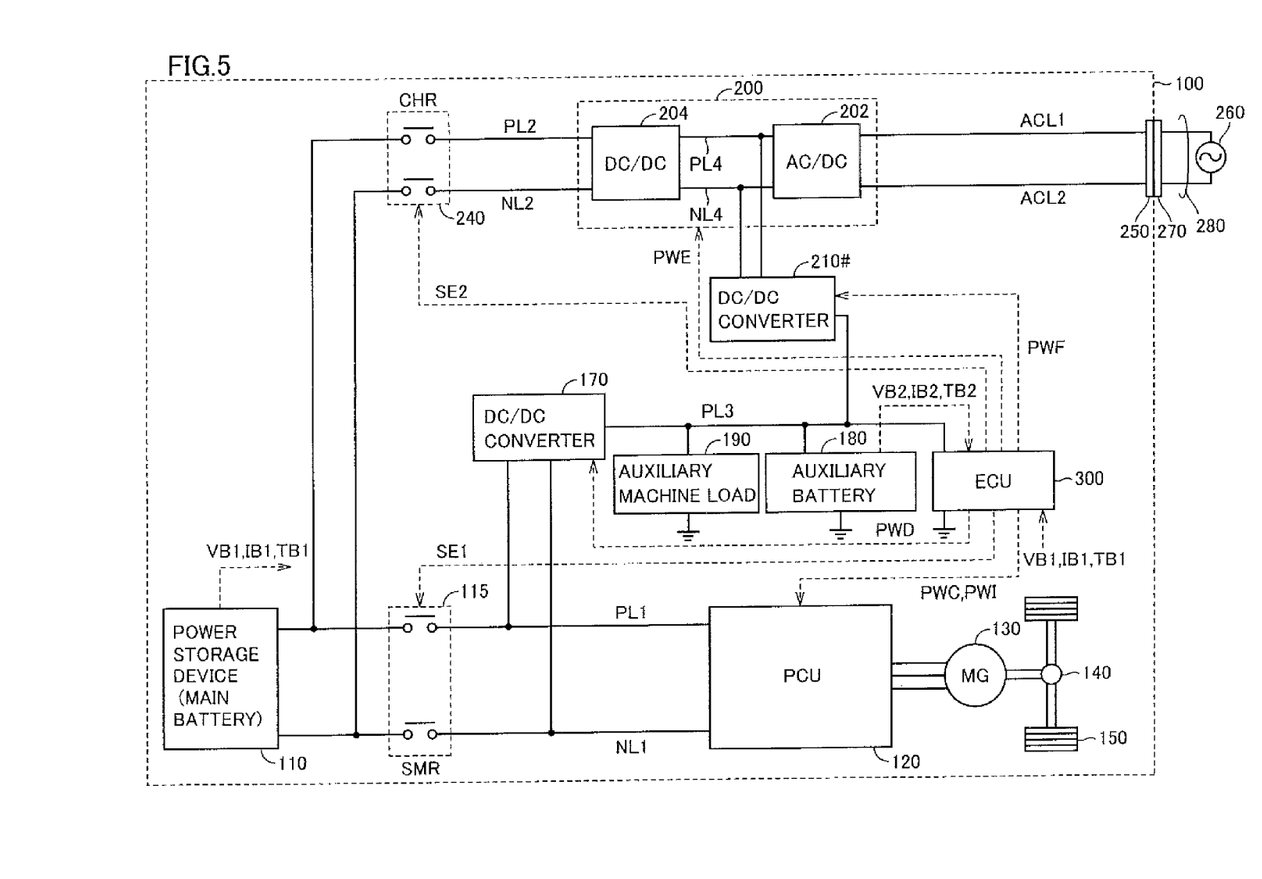
FIG. 5 is a block diagram representing a configuration of an electric powered vehicle including a power supply system according to a modification of an embodiment of the present invention.

FIG. 5 is a block diagram representing a configuration of an electric powered vehicle and a power supply system thereof according to a modification of the present embodiment.

Referring to FIG. 5, an electric powered vehicle 100# according to a modification of the present embodiment differs from electric powered vehicle 100 of FIG. 1 in that a DC/DC converter 210# is arranged instead of AC/DC converter 210. According to the configuration of FIG. 5, DC/DC converter 210# corresponds to "second power converter".

DC/DC converter 210# is configured to convert the DC power on power line PL4 and ground line NL4 into the charging electric power for auxiliary battery 180 based on control signal PWF from ECU 300. Since DC/DC converter 210# is provided at the path of external charging, the rated power and power consumption during operation are low, as compared to those of DC/DC converter 170 provided at the path between power storage device 110 and the traction motor (motor generator 130).

For charge device 200, the power conversion by AC/DC converter 202 must be ensured, among the power conversion in a direction opposite to that of the power conversion for external charging, in order to provide the electric power from power storage device 110 to DC/DC converter 210#. Therefore, DC/DC converter 204 must be configured to enable power conversion bidirectionally, likewise with FIG. 1.

AC/DC converter 202 only requires the power conversion capability in one direction, converting the AC power from external power supply 260 into DC power for output onto power line PL4. Therefore, in AC/DC converter 202, bridge circuit 116 can be constituted of a simple diode bridge without using a power semiconductor switching element in the circuit configuration shown in FIG. 2.

The remaining configuration of electric powered vehicle 100# shown in FIG. 5 is similar to that of electric powered vehicle 100 shown in FIG. 1. Therefore, detailed description will not be repeated.

Figure 6:
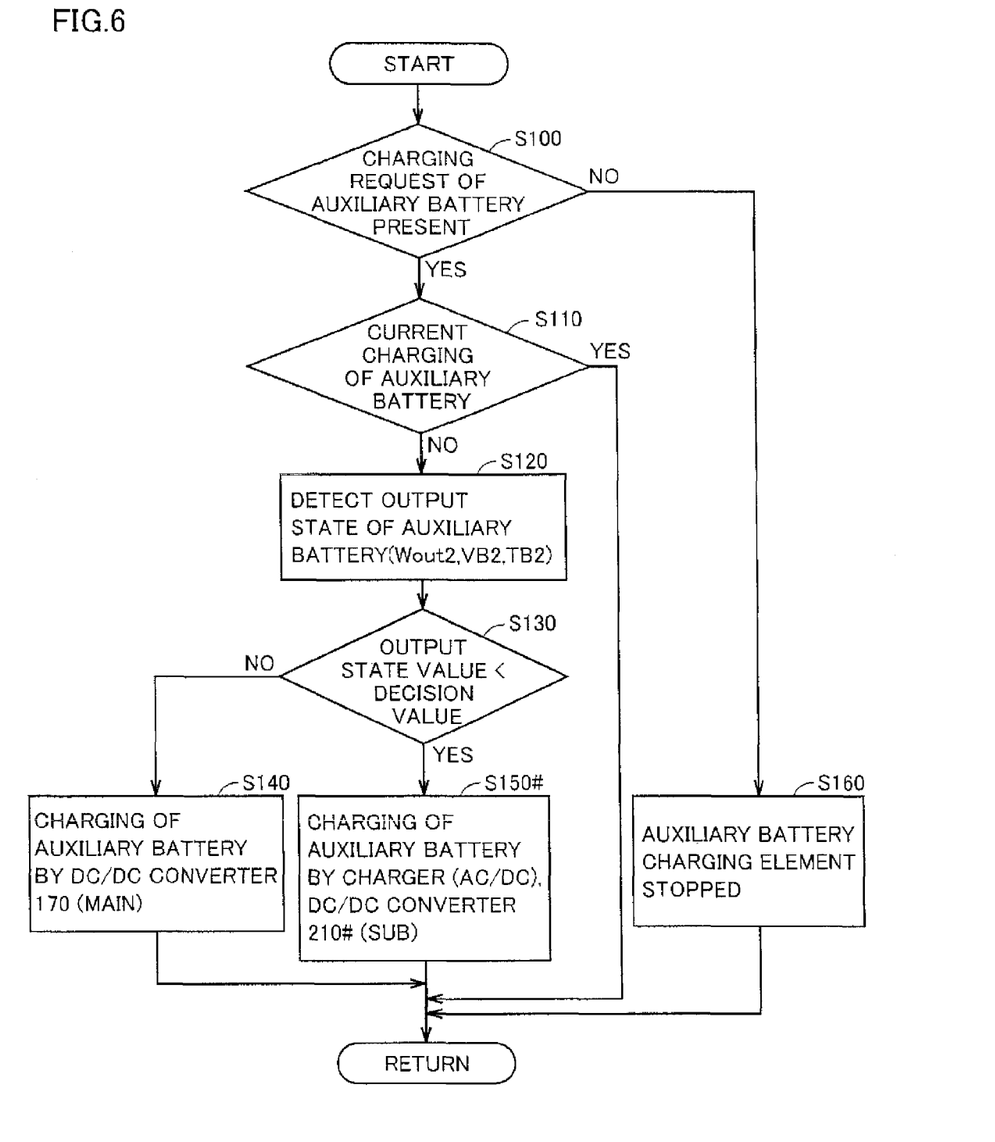
FIG. 6 is a flowchart for describing an auxiliary battery charge control at the power supply system according to a modification of an embodiment of the present invention.

FIG. 6 represents a flowchart for describing auxiliary battery charge control in the power supply system for the electric powered vehicle according to a modification of the present embodiment. The control process by the flowchart shown in FIG. 6 is executed at a predetermined cycle by ECU 300, instead of the control process by the flowchart of FIG. 4.

Referring to FIG. 6 corresponding to an auxiliary battery charging control at an electric powered vehicle according to a modification of the present embodiment, ECU 300 executes step S150#, instead of step S150 (FIG. 4), following a YES determination at step S130. The process of the other steps is similar to that of FIG. 4. Therefore, detailed description will not be repeated.

When the output of auxiliary battery 180 is reduced (YES determination at S130), auxiliary battery 180 can be charged by DC/DC converter 204 and DC/DC converter 210# according to electric powered vehicle 100# in the modification of the present embodiment. Namely, likewise with the configuration of FIG. 1, auxiliary battery 180 can be charged without having to use SMR 115 and DC/DC converter 170 that have a large power consumption.

Therefore, at electric powered vehicle 100# according to a modification of the present embodiment, a charging path of auxiliary battery 180 by the electric power from power storage device 110 can be reliably formed even in the case where the output of auxiliary battery 180 is reduced and sufficient output power of auxiliary battery 180 cannot be ensured, likewise with electric powered vehicle 100 shown in FIG. 1.

The configuration subsequent to power line PL1 (the vehicle running system) according to the present embodiment and modification thereof is not limited to the depicted configuration. The configuration can be also applied to any electric powered vehicle incorporating an electric motor directed to generating a wheel driving force such as an electric vehicle, hybrid vehicle, fuel cell vehicle, as set forth above.

Additionally, an arbitrary circuit configuration can be employed for charge device 200 directed to external charging as long as bidirectional power conversion in the above-described required range is allowed. For example, although an insulation type charge device employing a transformer 117 is exemplified in FIG. 3, a non-insulation type charge device may be employed instead.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

INDUSTRIAL APPLICABILITY

The present invention can be applied to an electric powered vehicle capable of being charged by an external power supply, incorporating a main power storage device (high voltage) for feeding power to a traction motor, and a sub power storage device (low voltage) for feeding power to an auxiliary machine including a control device.

REFERENCE SIGNS LIST 100 electric powered vehicle; 110 power storage device; 112, 114, 116 bridge circuit; 115 system main relay (SMR); 117 transformer; 170, 210# DC/DC converter (for charging auxiliary battery); 121 converter; 122 inverter; 130 motor generator; 140 power transmission gear; 150 driving wheel; 180 auxiliary battery; 190 auxiliary machine load; 200 charge device; 202 AC/DC converter; 204 DC/DC converter; 240 charge relay (CHR); 210 AC/DC converter (for charging auxiliary battery); 250 connection unit; 260 external power supply; 270 charge connector; 280 charge cable; 300 control device; ACL1, ACL2, HPL, PL1, PL2, PL3, PL4 power line; C1, C2, C3 smoothing capacitor; IB1, IB2 current; L1, L2 reactor; NL1, NL2, NL4 ground line; PWC, PWD, PWE, PWF, PWI, SE1, SE2, SE1, SE2 control signal; TB1, TB2 temperature; VB1, VB2 voltage; Vac AC voltage; Vdc DC voltage; Wout2 output power upper limit (auxiliary battery)

The invention claimed is:

1. A power supply system for an electric powered vehicle, comprising:
    a main power storage device for storing electric power input/output with respect to an electric motor generating vehicle driving power,
    a charge device for selectively executing a first power conversion of converting electric power from an external power supply into charging electric power for said main power storage device, and a second power conversion that is at least a portion of power conversion in a direction opposite to the direction of said first power conversion,
    a sub power storage device having an output voltage lower than the output voltage of said main power storage device,
    a first power converter connected to a path between said main power storage device and said electric motor for converting the electric power from said main power storage device into charging electric power for said sub power storage device,
    a second power converter connected to a path between a connection unit for connection with said external power supply and said main power storage device, for converting electric power obtained by said second power conversion through said charge device into the charging electric power for said sub power storage device, and
    a control device for selectively executing, when said sub power storage device is to be charged, a first charge of charging said sub power storage device by said first power converter while said charge device and said second power converter are stopped, and a second charge of charging said sub power storage device by said charge device and said second power converter while said first power converter is stopped, according to an output state of said sub power storage device.

2. The power supply system for an electric powered vehicle according to claim 1, wherein said control device selects said second charge to charge said sub power storage device when a state value indicating the output state of said sub power storage device is lower than a predetermined decision value.

3. The power supply system for an electric powered vehicle according to claim 2, wherein said state value is one of an allowable electric power output upper an output voltage and temperature of said sub power storage device.

4. The power supply system for an electric powered vehicle according to claim 1, wherein
    said external power supply supplies AC power,
    said charge device includes
    a third power converter for carrying out AC/DC power conversion bidirectionally between a first power line connected to said external power supply in an external charging mode, and a second power line for transmitting DC voltage, and a fourth power converter for carrying out DC/DC power conversion bidirectionally between said second power line and said main power storage device, in said second power conversion, said third power converter and said fourth power converter convert the electric power from said main power storage device into AC power for output onto said first power line, and said second power converter converts AC power of said first power line obtained by said second power conversion into DC power for charging said sub power storage device.

5. The power supply system for an electric powered vehicle according to claim 1, wherein said external power supply supplies AC power, said charge device includes a third power converter for converting AC power of a first power line connected with said external power supply in an external charging mode into DC power for output onto a second power line for transmitting DC voltage, and a fourth power converter for carrying out DC/DC power conversion bidirectionally between said second power line and said main power storage device, in said second power conversion, said fourth power converter converts electric power from said main power storage device into DC voltage for output onto said second power line, and said second power converter converts DC power of said second power line obtained by said second power conversion into DC power for charging said sub power storage device.

6. The power supply system for an electric powered vehicle according to claim 1, wherein power consumption by said first power converter is greater than a sum of power consumption by said second power converter and power consumption by said charge device through said second power conversion.

7. The power supply system for an electric powered vehicle according to claim 1, wherein said second power converter is configured to generate charging electric power for said sub power storage device with the electric power from said external power supply as a source in an external charging mode, said control device executes a third charge of charging said sub power storage device by said second power converter while said first power converter is stopped in said external charging mode.

8. An electric powered vehicle allowing charging by an external power supply, said electric powered vehicle comprising:

an electric motor generating vehicle driving power, a main power storage device for storing electric power input/output with respect to said electric motor, a sub power storage device having an output voltage lower than the output voltage of said main power storage device, a charge device for selectively executing a first power conversion of converting electric power from said external power supply into charging electric power for said main power storage device, and a second power conversion that is at least a portion of power conversion in a direction opposite to the direction of said first power conversion, a first power converter connected to a path between said main power storage device and said electric motor for converting electric power from said main power storage device into charging electric power for said sub power storage device, a second power converter connected to a path between a connection unit for connection with said external power supply and said main power storage device, for converting electric power obtained by said second power conversion through said charge device into charging electric power for said sub power storage device, and having a rated output smaller than the rated output of said first power converter, and a control device for selectively executing, when said sub power storage device is to be charged, a first charge of charging said sub power storage device by said first power converter while said charge device and said second power converter are stopped, and a second charge of charging said sub power storage device by said charge device and said second power converter while said first power converter is stopped, according to an output state of said sub power storage device.

9. The electric powered vehicle according to claim 8, wherein said control device selects said second charge to charge said sub power storage device when a state value indicating an output state of said sub power storage device is lower than a predetermined decision value.

10. The electric powered vehicle according to claim 8, wherein power consumption by said first power converter is greater than a sum of power consumption by said second power converter and power consumption by said charge device through said second power conversion.

11. The electric powered vehicle according to claim 8 wherein said second power converter is configured to generate charging electric power for said sub power storage device with the electric power from said external power supply as a source in an external charging mode, said control device executes a third charge of charging said sub power storage device by said second power converter while said first power converter is stopped in said external charging mode.

12. A method of controlling a power supply system for an electric powered vehicle incorporating an electric motor that generates vehicle driving power, said power supply system including a main power storage device for storing electric power input/output with respect to said electric motor, a sub power storage device having an output voltage lower than the output voltage of said main power storage device, a charge device for selectively executing a first power conversion of converting electric power from an external power supply into charging electric power for said main power storage device, and a second power conversion that is at least a portion of power conversion in a direction opposite to the direction of said first power conversion, a first power converter connected to a path between said main power storage device and said electric motor for converting electric power from said main power storage device into charging electric power for said sub power storage device, and a second power converter connected to a path between a connection unit for connection with said external power supply and said main power storage device, for converting electric power obtained by said second power conversion through said charge device into charging electric power for said sub power storage device, and having a rated output smaller than the rated output of said first power converter, said method of controlling comprising the steps of:

sensing a charge request of said sub power storage device, detecting an output state of said sub power storage device when charging is started in response to said charge request, and selecting, according to said detected output state, a first charge of charging said sub power storage device by said first power converter while said charge device and said second power converter are stopped, and a second charge of charging said sub power storage device by said charge device and said second power converter while said first power converter is stopped.

13. The method of controlling a power supply system for an electric powered vehicle according to claim 12, wherein, in said step of selecting, said second charge is selected to charge said sub power storage device when a state value indicating an output state of said sub power storage device is lower than a predetermined decision value.

14. The method of controlling a power supply system for an electric powered vehicle according to claim 13, wherein said state value is one of an allowable electric power output upper limit an output voltage and temperature of said sub power storage device.

\* \* \* \* \*